United States Patent [19]
Eggert et al.

[11] Patent Number: 5,853,343
[45] Date of Patent: Dec. 29, 1998

[54] DUAL MODE CONTINUALLY VARIABLE TRANSMISSION

[75] Inventors: Ulrich Eggert, Viersen, Germany; Phillip Koneda, Novl; Thomas Theodore Tibbles, Livonia, both of Mich.

[73] Assignee: Ford Global Technologies, Inc., Dearborn, Mich.

[21] Appl. No.: 697,964

[22] Filed: Sep. 5, 1996

[51] Int. Cl.[6] ................................................. F16H 37/02
[52] U.S. Cl. .......................................... 475/210; 475/211
[58] Field of Search ..................................... 475/209–212

[56] References Cited

U.S. PATENT DOCUMENTS

| | | |
|---|---|---|
| 2,076,926 | 4/1937 | Timmermann . |
| 3,110,189 | 11/1963 | Steuer . |
| 3,203,277 | 8/1965 | General . |
| 3,257,867 | 6/1966 | Dennick . |
| 3,340,749 | 9/1967 | Magg et al. ............................. 475/211 |
| 3,715,930 | 2/1973 | Beliveau et al. . |
| 3,850,050 | 11/1974 | Lemmens . |
| 3,924,480 | 12/1975 | Carapellucci . |
| 4,043,225 | 8/1977 | Momose . |
| 4,290,320 | 9/1981 | Abbott . |
| 4,304,150 | 12/1981 | Lupo et al. . |
| 4,329,888 | 5/1982 | Falzoni . |
| 4,335,629 | 6/1982 | Falzoni . |
| 4,342,238 | 8/1982 | Gardner . |
| 4,354,401 | 10/1982 | Omitsu . |
| 4,392,394 | 7/1983 | Hofbauer et al. . |
| 4,467,670 | 8/1984 | Kawamoto . |
| 4,589,303 | 5/1986 | Roberts . |
| 4,599,916 | 7/1986 | Hirosawa . |
| 4,608,885 | 9/1986 | Koivunen . |
| 4,624,153 | 11/1986 | Itoh et al. . |
| 4,644,820 | 2/1987 | Macey et al. . |
| 4,644,821 | 2/1987 | Sumiyoshi et al. . |
| 4,852,427 | 8/1989 | van der Veen . |
| 4,856,369 | 8/1989 | Stockton . |
| 4,946,429 | 8/1990 | Sherman . |
| 5,201,691 | 4/1993 | Doyle ....................................... 475/210 |
| 5,643,131 | 7/1997 | Kuhn et al. ............................. 475/210 |

FOREIGN PATENT DOCUMENTS

| | | |
|---|---|---|
| 65463 | 3/1947 | Denmark ................................. 475/211 |
| 0004130 A1 | 9/1979 | European Pat. Off. . |
| 0413476B1 | 8/1990 | European Pat. Off. . |
| 3543635 | 6/1986 | Germany ................................ 475/211 |
| 4234747 | 12/1993 | Germany ................................ 475/210 |
| 56-153147 | 11/1981 | Japan . |
| 28047 | 2/1983 | Japan ..................................... 475/210 |
| 4-285354 | 10/1992 | Japan ..................................... 475/210 |
| 2025545 | 1/1980 | United Kingdom . |
| 2180020 | 3/1987 | United Kingdom . |
| 2233722 | 1/1991 | United Kingdom ................... 475/210 |

OTHER PUBLICATIONS

Paper 841305, presented at International Conference on Fuel Efficient Power Trains and Vehicles, London, England, Oct. 1984, "The Ford Research Dual Mode Continuously Variable Transmission", T.R. Stockton, pp. 117–123.

Paper 9636349, presented at, International Conference on Continuously Variable Power Transmissions, Sep. 11–12, 1996, Yokohama Japan, "110–Dry Hybrid Belt CVT", M. Takayama, pp. 65–71.

*Primary Examiner*—Khoi Q. Ta
*Attorney, Agent, or Firm*—James J. Dottavio

[57] ABSTRACT

A continually variable transmission includes a torque converter for producing a hydrokinetic connection between a power source and input shaft, a low gear drive mechanism, a belt drive mechanism arranged in parallel with the low gear mechanism between the input shaft and an intermediate shaft, a forward-reverse gearset, a forward clutch, a reverse brake for controlling operation of the gearset in the direction of its output, and a mode clutch for alternately selecting the torque path between the input shaft and intermediate shaft.

28 Claims, 3 Drawing Sheets

DUAL MODE CONTINUALLY VARIABLE TRANSMISSION

BACKGROUND OF THE INVENTION

1. Technical Field

This invention relates to the field of continually variable transmissions that produce a step-less, continually variable range of speed ratios. More particularly, the invention pertains to such transmissions having fixed ratio and variable ratio drive mechanisms.

2. Description of the Prior Art

Automatic transmissions for automotive use that employ a belt drive, variable speed ratio mechanism, usually include a torque converter located in the driveline between the power source and the continually variable drive mechanism. At the lower speed ratios, the torque converter produces torque multiplication to assist accelerating the vehicle from rest. At higher speed ratios, the torque converter is locked up to produce a mechanical connection between its input and output, rather than the conventional hydrodynamic connection, to minimize losses inherent in its operation. At higher speed ratios, the belt drive mechanism alone produces the torque multiplication and speed reduction between the power source and drive wheels. However, in conventional continually variable transmission arrangements, acceleration of the vehicle from rest is only marginally acceptable when compared to current four-speed automatic transmission in current use.

In the design of continually variable transmissions, there is a long felt need to extend as much as practicable the range of speed ratios that can be produced by the belt drive mechanism and to minimize the torsional loads on the belt drive mechanism. Furthermore, it is known that in conventional continually variable transmissions that include a torque converter, the pumping losses during low speed operation, particularly when accelerating the vehicle from rest, are high, due to high clamping loads between the sheaves of the belt drive mechanism and the belt itself.

SUMMARY OF THE INVENTION

An object of this invention is to provide, in a continually variable automatic transmission, a low gear operating ratio that bypasses the belt drive mechanism and is operative only at low speed conditions.

A first advantage of the use of a transmission according to the present invention is that the ratio range of the transmission can be extended by the difference between the speed ratio of the low gear mechanism and the lowest operating speed ratio of the belt drive mechanism in the underdrive range. This larger range allows for a larger engine speed to vehicle speed operating envelope. A broader operating envelope produces easier acceleration of the vehicle and better fuel economy.

A second advantage of the use of the transmission according to the present invention, is a reduction in the magnitude of loads applied to or developed in the belt drive mechanism. The belt drive mechanism only handles the peak engine torque, but not peak turbine torque, during a brake stall condition. This reduction in peak load, means that a transmission having a particular size belt drive mechanism can be applied to a larger engine displacement and power application than can conventional continually variable transmissions.

By using a low gear drive mechanism to bypass the belt drive mechanism, the pumping pressure required during vehicle acceleration from rest is limited to the pressure required to engage the hydraulically actuated friction clutches; therefore, the high pumping losses normally present in conventional single mode continually variable transmission required to driveably connect the drive belt and the sheaves on which it operates is eliminated. This reduction in pumping losses during vehicle acceleration allows greater engine torque to be available to accelerate the vehicle.

A continually variable transmission according to this invention includes an input shaft; an output shaft; a torque converter for producing a hydrodynamic connection between the power source and input shaft; a first drive mechanism having a first input and a first output, for producing a fixed ratio of the speed of said first input to the speed of said first output; a second drive mechanism arranged in parallel with the first drive mechanism, having a second input and second output, for producing a stepless, continually variable range of ratios of the speed of said second input to the speed of said second output, the lowest ratio produced by the second drive mechanism being higher than the fixed speed ratio produced by the first drive mechanism; a mode clutch for alternately driveably connecting and releasing either the members of a first group consisting of the first input and second input or the members of a second group consisting of the first output and second output; and a gearset and clutch for driving the output shaft in the same direction as the input shaft and for reversing the direction of rotation of the output shaft relative to the direction of rotation of the input shaft.

DESCRIPTION OF THE PREFERRED EMBODIMENT

Figure 1:
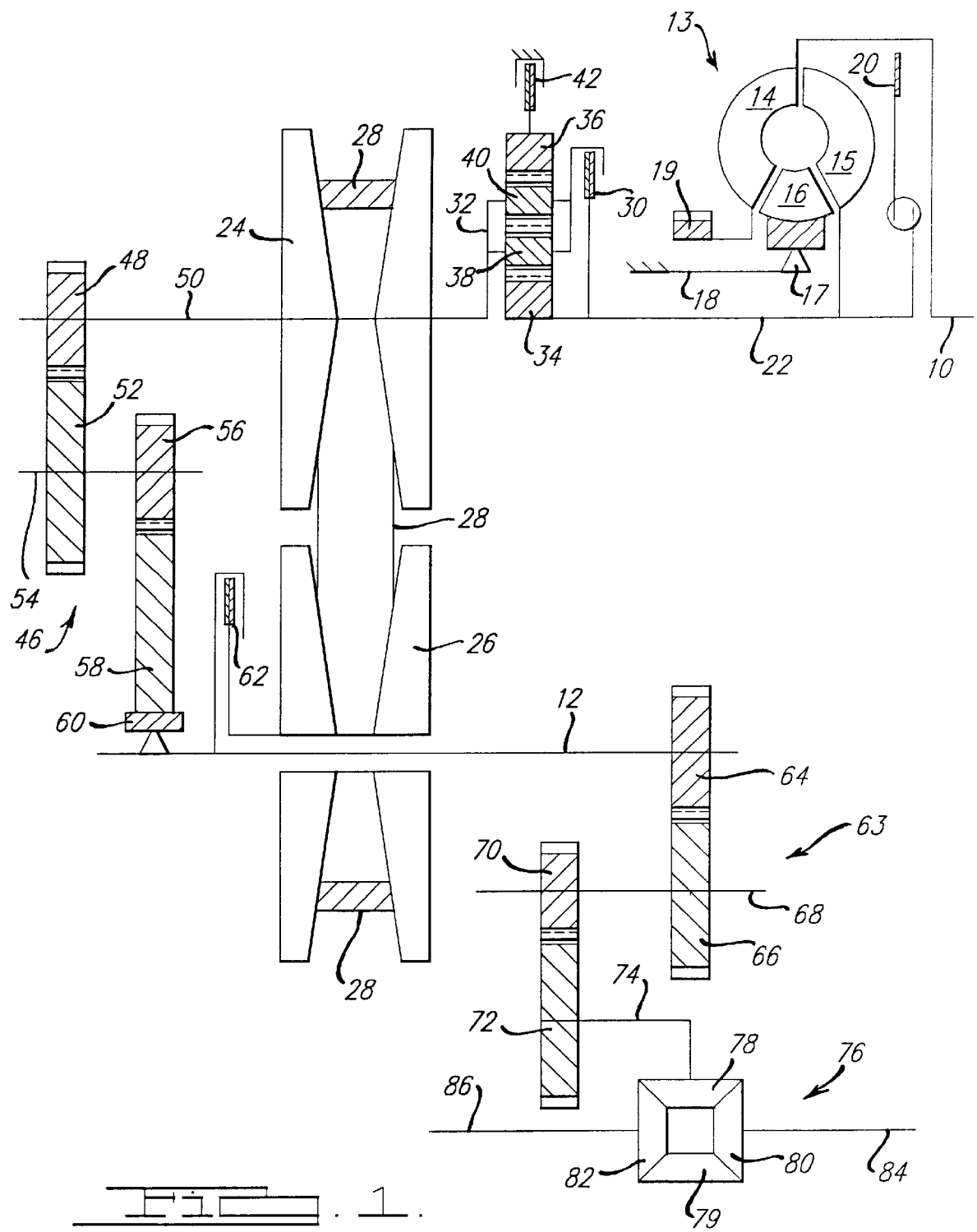
FIG. 1 is a schematic diagram of a continually variable transmission showing a belt drive mechanism having planetary and layshaft gearing and a torque converter.

Referring first to FIG. 1, a transmission according to this invention is adapted for connection to the crankshaft of an engine or the drive shaft of another power source and an output shaft 12, which is directly connected to a final drive gearset.

A torque converter 13 has a bladed impeller wheel 14 hydrodynamically connected to a bladed turbine wheel 15. A hydraulically actuated bypass clutch 20 is engaged to connect mechanically the turbine and impeller, or is disengaged so that the connection between the impeller and turbine is entirely hydrodynamic. A bladed stator wheel 16 is rotatably supported on a fixed shaft 18, which holds the inner race of an overrunning clutch 17 fixed against rotation. Clutch 17 produces a one-way drive connection between stator wheel 16 and shaft 18. An oil pump 19 supplies hydraulic fluid to the toroidal path defined by impeller 14, turbine 15, and stator 16. The turbine rotates on an input shaft 22. A third shaft 50, supports the input sheave 24 of a belt drive mechanism, whose output sheave 26 is rotatably supported on second shaft 27, which is a sleeve shaft, concentric with a first shaft, output shaft 12. The belt drive mechanism produces a variable ratio of the speed of shaft 27 to the speed of shaft 50 by selectively varying the radii on sheaves 24 and 26 where an endless flexible drive belt 28 engages the sheaves. For example, when shaft 27 is underdriven, the belt engages sheave 24 at a small radius and engages sheave 26 at a relatively large radius. The radius of the point of contact between the drive belt and the sheaves is controlled by moving the position of one of the sheaves of each of the sheave assembly 24, 26 with respect to the other sheave of that assembly along the axis of the shaft on which it is supported.

A forward and reverse planetary gearset, symmetrically disposed about the axis of shaft 22, includes an hydraulically actuated friction clutch 30, which releasably connects shaft 22 and a planetary carrier 32. The gearset includes a sun gear 34, fixed to shaft 22; a ring gear 36, surrounding the sun gear; a first set of planet pinions 38, supported rotatably on carrier 32, in meshing engagement with the sun gear 34; and a second set of planet pinions 40, rotatably supported on carrier 32, in continuous meshing engagement with ring gear 36 and the first set of planet pinions 38. Ring gear 36 is releasably held against rotation by an hydraulically actuated reverse brake 42, which may be a multiple friction disc brake, as shown in FIG. 1, or a brake band, as shown in FIG. 3.

A layshaft gearset 46 includes a first pinion 48, fixed to third shaft 50; and a first gear 52, fixed to layshaft 54, in continuous meshing engagement with pinion 48. Shaft 50 is driveably connected to carrier 32. Layshaft 54 carries a second pinion 56, is in continuous meshing engagement with a second gear 58, is supported rotatably on output shaft 12 through a one-way clutch 60, which produces a one-way drive connection between gear 58 and shaft 12 so that the output shaft is driven by gear 58 when power is transmitted from input shaft 10 to the output shaft. Clutch 60 overruns when power is transmitted from the output shaft 12 to the input shaft 22.

An hydraulically actuated mode clutch 62 releasably connects sheave 26 and shaft 12. The final drive gearing shown in FIG. 1 is in the form of a layshaft gearset having a first pinion 64 fixed to output shaft 12, in continuous meshing engagement with pinion 66, which is fixed to and rotatably supported on layshaft 68. Second pinion 70, fixed to layshaft 68, is in continuous meshing engagement with an output gear 72, fixed to and rotatably supported on carrier 74. A differential mechanism 76 includes bevel pinions 78, 79, driveably connected to carrier 74, and side bevel gears 80, 82, in continuous meshing engagement with bevel pinions 78, 79, and driveably connected to axleshafts 84, 86, respectively. Shafts 84, 86 may include halfshafts incorporating constant velocity joints. Shafts 84, 86 are driveably connected to the drive wheels of the motor vehicle.

Figure 2:
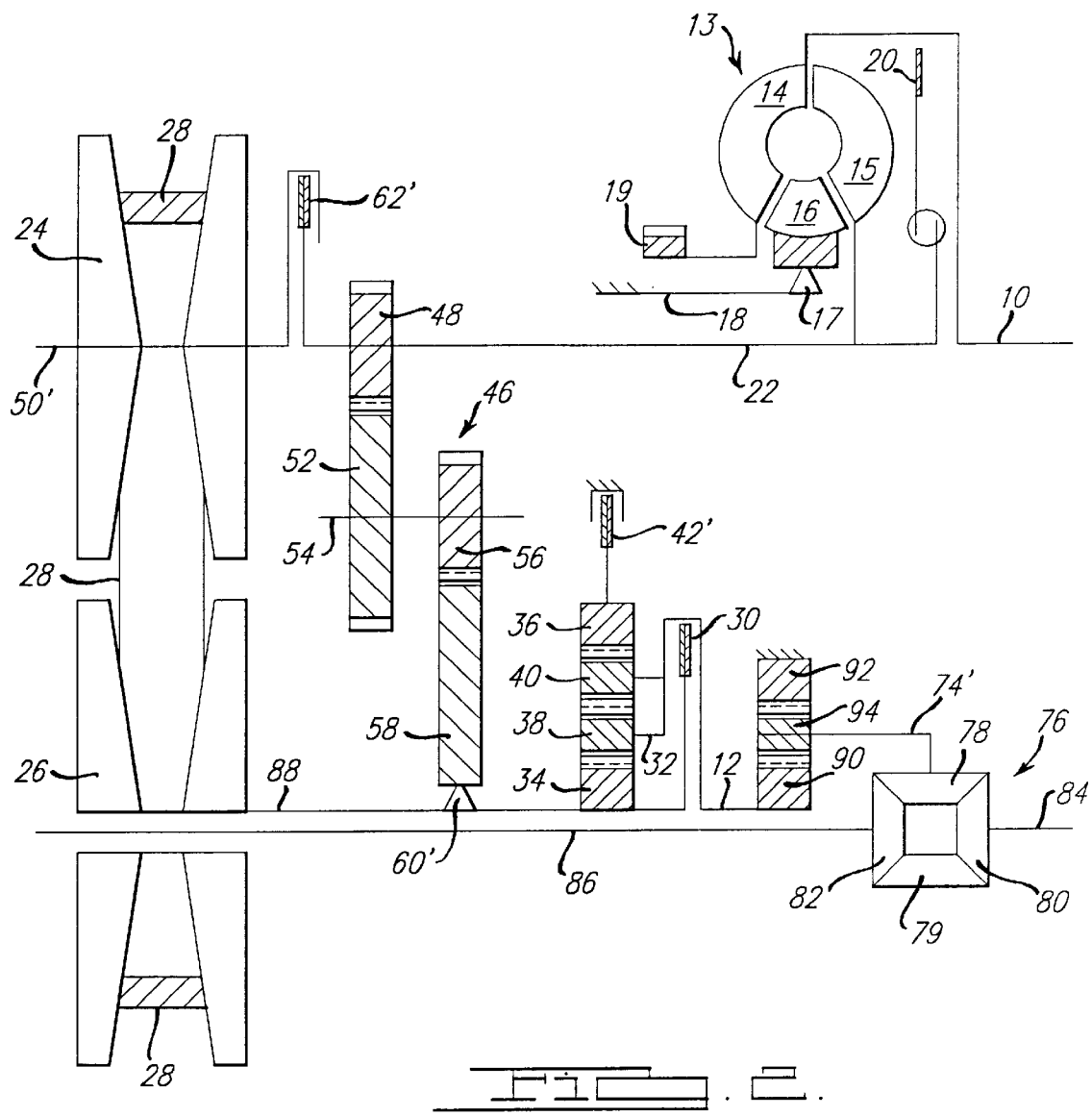
FIG. 2 is a schematic diagram of a U-drive arrangement of the transmission of FIG. 1.
Figure 3:
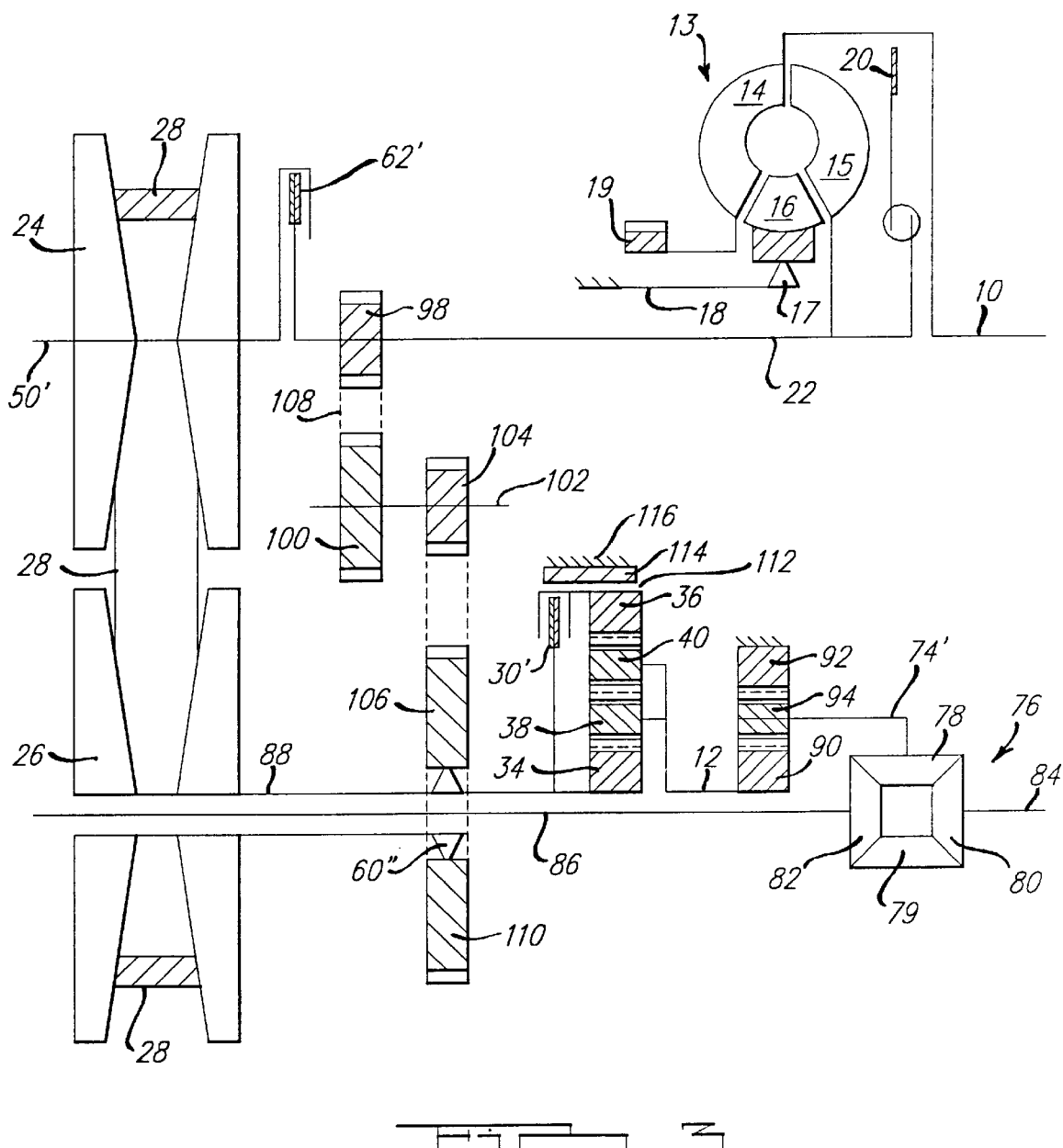
FIG. 3 is an alternate embodiment of the U-drive transmission arrangement of FIG. 2.

FIGS. 2 and 3 show an alternate embodiment for the final drive mechanism. It includes a sun gear 90 fixed to output shaft 12, a ring gear 92 surrounding the sun gear and fixed against rotation on the transmission housing, a carrier 74' driveably connected to bevel pinions 78, 79, and a set of planet pinions 94 rotatably supported on carrier 74, in continuous meshing engagement with sun gear 90 and ring gear 92.

Referring once again to FIG. 1, a motor vehicle driven through this transmission is accelerated from rest by engaging forward clutch 30, disengaging mode clutch 62 and torque converter bypass clutch 20. Sun gear 34 and carrier 32 are driven at the speed of shaft 22 due to the engagement of forward clutch 30. With the transmission disposed in this way, one-way clutch 60 completes a one-way drive connection between shaft 50 and output shaft 12 through the low gear drive mechanism 46. Power is transmitted from input shaft 12 through the torque converter 13, shaft 22, clutch 30, carrier 32, shaft 50, low gear drive mechanism 46, one-way clutch 60, shaft 12, final drive mechanism 63, and differential mechanism 76 to shafts 84, 86.

An upshift from low gear results by maintaining the forward clutch 30 engaged, engaging the mode clutch 62 and disposing the drive belt mechanism at the extremity of its underdrive range. With the transmission so disposed, one-way clutch 60 overruns.

The torque delivery path includes crankshaft 10, torque converter 13, shaft 22, forward clutch 30, carrier 32, shaft 50, the belt drive mechanism, second shaft 27, mode clutch 62, shaft 12, final drive gearing 63, differential mechanism 76, and shafts 84, 86.

Thereafter, the belt drive mechanism can operate over its full range to the maximum overdrive extremity of that range by continually changing the position of drive belt 28 on sheaves 24, 26.

To produce reverse drive, reverse brake 42, which is either a disc-type friction brake or a brake band engaging ring gear 36, is held against rotation on, the transmission housing, clutch 30 is disengaged, one-way clutch 60 drives, and mode clutch 62 is disengaged. Therefore, with ring gear 36 held against rotation, carrier 32 is driven in a reverse direction relative to that of shaft 22 and at the speed of shaft 22. The torque delivery path includes crankshaft 10, torque converter 13, input shaft 22, the reverse drive gearset, shaft 50, low gear ratio mechanism 46, one-way clutch 60, shaft 12, final drive gearing 63, differential mechanism 76, and axleshafts 84, 86. Preferably, no speed reduction is produced by the forward-reverse gearset.

Preferably, the stall torque ratio of the torque converter is in the range 2.0–2.3. When the transmission is operating in low gear ratio, the ratio of the speed of shaft 50 to the speed of shaft 12 is in the range 3.1–3.5. The lowest ratio of the speed of shaft 50 to the speed of shaft 12 produced by the drive belt mechanism is approximately 2.12; therefore, when an upshift from the low gear ratio produced by gearset 46 to the operating range produced by the belt drive mechanism is completed, i.e., by maintaining engagement of the forward clutch 30 and engaging the transfer clutch 62, the speed ratio produced by the transmission undergoes a step change to 2.12 from 3.1–3.5.

Referring now to FIGS. 2 and 3, it can be seen that the reverse drive gearset has been relocated from a position of concentricity with crankshaft 10 to a position where it is concentric about the axis through differential mechanism 76 and the axleshafts 84, 86. Furthermore, the low gear mechanism has been moved to a position between the torque converter 13 and the belt drive mechanism, and the layshaft final gear drive has been replaced by a planetary gearset. The final drive gearset includes sun gear 90 driveably connected to output shaft 12, ring gear 92 surrounding the sun gear and fixed against rotation on the transmission housing, carrier 74', and a set of planet pinions 94 rotatably supported on the carrier and in continuous meshing engagement with the sun gear 90 and ring gear 92. The forward-reverse planetary gearset includes sun gears 34, which is driveably connected to a first shaft 88, which, like output shaft 12, is a sleeve shaft arranged concentrically with the axis of the axleshafts. Sheave assembly 24 of the belt drive mechanism is supported on a first shaft 50' and pinion 48 of the low gear mechanism 46 is supported on second shaft 22.

The arrangement of FIG. 2 produces a low gear ratio when the forward clutch 30 is engaged, mode clutch 62' is disengaged, and one-way clutch 60' is driving. The torque delivery path between crankshaft 10 and the axleshafts includes torque converter 13, first shaft 22, low gear mechanism 46, one-way clutch 60', third shaft 88, forward-reverse planetary gearset, forward clutch 30, output shaft 12, final drive gearset, differential mechanism 76, and axleshafts 84, 86.

An upshift from the first gear ratio to the lowest speed ratio produced by the belt drive mechanism occurs by maintaining forward clutch 30 engaged and by engaging the mode clutch 62', which causes clutch 60' to overrun. With the transmission so disposed, the motor vehicle can be operated through a continuously variable range of forward speed ratios by continually varying the radii where the belt 28 engages sheaves 24, 26.

In this mode of operation, power is transferred through the belt drive mechanism instead of through the low gear layshaft gear arrangement from input shaft 22. The torque path includes transfer clutch 62', third shaft 88, the forward-reverse planetary gearset, clutch 30, output shaft 12, the final drive gearing, and differential mechanism 76. Preferably, the forward-reverse gearing produces no speed change.

To produce reverse drive, reverse brake 42' is applied, forward clutch 30 is disengaged, and transfer clutch 62' is disengaged. In this mode of operation, power is transmitted from input shaft 22, low gear layshaft mechanism 46', clutch 60', shaft 88, the forward-reverse planetary gearset, and final drive gearing to the differential mechanism 76.

Referring now to FIG. 3, which is a U-drive arrangement similar to that of FIG. 2, the low gear gearset 46 has been replaced by a chain drive mechanism between first shaft or input shaft 22 and third shaft 88. The chain drive mechanism includes a first sprocket wheel 98, driveably connected to the shaft 22; a driven sprocket wheel 100, fixed to and rotatably supported on shaft 102, which is arranged parallel to shaft 22; a sprocket wheel 104, adjacent sprocket 100; sprocket wheel 106; and one-way coupling 60", which produces a one-way drive connection between sprocket wheel 106 and third shaft 88. A drive chain 108 driveably engages the teeth of sprocket wheels 98, 101, and drive chain 110 engages the teeth of sprocket wheels 104, 106.

Preferably, sprocket 98 has 33 teeth, sprocket 100 has 55 teeth, sprocket 104 has 55 teeth, and sprocket 106 has 51 teeth. Preferably, the ratio of the pitch diameter of ring gear 36 to the pitch diameter of sun gear 34 is 2.00. Preferably, the ratio of the pitch diameter of ring gear 92 to the pitch diameter of sun gear 90 is 2.62.

In the embodiment of FIG. 3, preferably the forward-reverse gearset and forward clutch are arranged as shown in FIG. 2 and operate as described with reference to FIG. 2. However, FIG. 3 also shows an alternate embodiment for the forward-reverse gearset and forward clutch, wherein ring gear 36 and forward clutch 30' are connected to a brake drum 112. A reverse brake band 114 frictionally engages drum 112, holds the drum against rotation on the transmission housing 116, and releases that frictional engagement in response to the pressurized state of a brake band servo (not shown).

The embodiment of FIG. 3 operates substantially identically to that of FIG. 2, except that low gear ratio is produced by transferring torque through the chain drive mechanism rather than through the layshaft low gear mechanism.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. A continually variable transmission for a motor vehicle driven by a power source, comprising:

an input shaft;

an output shaft;

a torque converter for producing a hydrodynamic connection between the power source and input shaft;

a first drive mechanism having a first input and a first output, for producing a fixed ratio of the speed of said first input to the speed of said first output;

a second drive mechanism arranged in parallel with the first drive mechanism, having a second input and second output, for producing a stepless, continually variable range of ratios of the speed of said second input to the speed of said second output, the lowest ratio produced by the second drive mechanism being higher than the fixed speed ratio produced by the first drive mechanism;

a mode clutch for alternately driveably connecting and releasing a pair of members selected from either a first group consisting of the first input and second input or a second group consisting of the first output and second output; and means for driving the output shaft in the same direction as the input shaft and for reversing the direction of rotation of the output shaft relative to the direction of rotation of the input shaft.

2. The transmission of claim 1, comprising:

a first shaft driveably connected to the first input;

a second shaft coaxial with the first shaft and driveably connected to the second input;

a third shaft disposed parallel to the first shaft and second shaft, and driveably connected to the first output and second output; and wherein the mode clutch alternately connects the first shaft and second shaft mutually and releases the first shaft and second shaft.

3. The transmission of claim 1, comprising:

a first shaft driveably connected to the first output;

a second shaft concentric with the first shaft and driveably connected to the second output;

a third shaft disposed parallel to the first shaft and second shaft, and driveably connected to the first input and second input; and wherein the mode clutch alternately connects the first shaft and second shaft mutually and releases the first shaft and second shaft.

4. The transmission of claim 2 wherein the first drive mechanism, comprises:

a first sprocket wheel fixed to the first shaft;

a layshaft disposed parallel to the first shaft;

a second sprocket wheel fixed to the layshaft;

a first chain or belt driveably engaging the first and second sprocket wheels;

a third sprocket wheel fixed to the layshaft and located adjacent the second sprocket wheel;

a fourth sprocket wheel;

an overrunning clutch supported on the third shaft, for producing a one-way drive connection between the third shaft and fourth sprocket wheel; and a second chain or belt driveably engaging the third and fourth sprocket wheels.

5. The transmission of claim 3 wherein the first drive mechanism, comprises:
   a first sprocket wheel fixed to the third shaft;
   a layshaft disposed parallel to the third shaft;
   a second sprocket wheel fixed to the layshaft;
   a first chain or belt driveably engaging the first and second sprocket wheels;
   a third sprocket wheel fixed to the layshaft and located adjacent the second sprocket wheel;
   a fourth sprocket wheel;
   an overrunning clutch supported on the second shaft, for producing a one-way drive connection between the second shaft and fourth sprocket wheel; and
   a second chain or belt driveably engaging the third and fourth sprocket wheels.

6. The transmission of claim 2, wherein the driving means comprises:
   a sun gear driveably connected to the third shaft;
   a ring gear surrounding the sun gear;
   a carrier driveably connected to the output shaft;
   a first set of planet pinions rotatably supported on the carrier, in continuous meshing engagement with the sun gear;
   a second set of planet pinions rotatably supported on the carrier, in continuous meshing engagement with the ring gear and the first set of planet pinions;
   a forward-reverse clutch for alternately driveably connecting mutually and releasing the third shaft and a member of the group consisting of the ring gear and carrier; and
   a reverse brake for alternately holding the ring gear against rotation and releasing the ring to rotate freely.

7. The transmission of claim 2, wherein the driving means comprises:
   a sun gear driveably connected to the third shaft;
   a ring gear surrounding the sun gear;
   a carrier driveably connected to the output shaft;
   a first set of planet pinions rotatably supported on the carrier, in continuous meshing engagement with the sun gear;
   a second set of planet pinions rotatably supported on the carrier, in continuous meshing engagement with the ring gear and the first set of planet pinions;
   a forward-reverse clutch for alternately driveably connecting mutually and releasing the carrier and third shaft; and
   a reverse brake for alternately holding the ring gear against rotation and releasing the ring to rotate freely.

8. A continually variable transmission for a motor vehicle driven by a power source, comprising:
   an input shaft;
   an output shaft;
   a torque converter for producing a hydrodynamic connection between the power source and input shaft;
   a first shaft driveably connected to the input shaft;
   a second shaft concentric with the first shaft;
   a third shaft disposed parallel to the first shaft and second shaft, and driveably connected to the first output and second output;
   a first drive mechanism driveably connected to the first shaft and third shaft, for producing a fixed ratio of the speed of said first shaft to the speed of said third shaft;
   a second drive mechanism driveably connected to the second shaft and third shaft, arranged in parallel with the first drive mechanism, for producing a stepless, continually variable range of ratios of the speed of said second shaft to the speed of said third shaft, the lowest speed ratio produced by the second drive mechanism being higher than said fixed speed ratio produced by the first drive mechanism;
   a mode clutch for alternately connecting the first shaft and second shaft mutually and for releasing the first shaft and second shaft;
   means for driving the output shaft in the same direction as the input shaft and for reversing the direction of rotation of the output shaft relative to the direction of rotation of the input shaft.

9. The transmission of claim 8 wherein the first drive mechanism, comprises:
   first sprocket wheel fixed to the first shaft;
   a layshaft disposed parallel to the first shaft;
   a second sprocket wheel fixed to the layshaft;
   a first chain or belt driveably engaging the first and second sprocket wheels; third sprocket wheel fixed to the layshaft and located adjacent the second sprocket wheel;
   a fourth sprocket wheel;
   an overrunning clutch supported on the third shaft, for producing a one-way drive connection between the third shaft and fourth sprocket wheel; and
   a second chain or belt driveably engaging the third and fourth sprocket wheels.

10. The transmission of claim 8, wherein the driving means comprises:
    a sun gear driveably connected to the third shaft;
    a ring gear surrounding the sun gear;
    a carrier driveably connected to the output shaft;
    a first set of planet pinions rotatably supported on the carrier, in continuous meshing engagement with the sun gear;
    a second set of planet pinions rotatably supported on the carrier, in continuous meshing engagement with the ring gear and the first set of planet pinions;
    a forward-reverse clutch for alternately driveably connecting mutually and releasing said third shaft and member of the group consisting of said ring gear and carrier; and
    a reverse brake for alternately holding the ring gear against rotation and releasing the ring to rotate freely.

11. The transmission of claim 9, wherein the driving means comprises:
    a sun gear driveably connected to the third shaft;
    a ring gear surrounding the sun gear;
    a carrier driveably connected to the output shaft;
    a first set of planet pinions rotatably supported on the carrier, in continuous meshing engagement with the sun gear;
    a second set of planet pinions rotatably supported on the carrier, in continuous meshing engagement with the ring gear and the first set of planet pinions;
    a forward-reverse clutch for alternately driveably connecting mutually and releasing said third shaft and member of the group consisting of said ring gear and carrier; and
    a reverse brake for alternately holding the ring gear against rotation and releasing the ring to rotate freely.

12. The transmission of claim 8, further comprising:
an overruning clutch for producing a one-way drive connection between the third shaft and the first drive mechanism.

13. A continually variable transmission for a motor vehicle driven by a power source, comprising:
an input shaft;
an output shaft;
a torque converter for producing a hydrodynamic connection between the power source and input shaft;
a first shaft driveably connected to the output shaft;
a second shaft concentric with the first shaft;
a third shaft disposed parallel to the first shaft and second shaft;
a first drive mechanism driveably connected to the first shaft and third shaft, for producing a fixed ratio of the speed of said third shaft to the speed of said first shaft;
a second drive mechanism arranged in parallel with the first drive mechanism driveably connected to the second shaft and third shaft, for producing a stepless, continually variable range of ratios of the speed of said third shaft to the speed of said second shaft, the lowest speed ratio produced by the second drive mechanism being higher than said fixed speed ratio produced by the first drive mechanism;
a mode clutch for alternately connecting the first shaft and second shaft mutually and for releasing the first shaft and second shaft; and
means for driving the output shaft in the same direction as the input shaft and for reversing the direction of rotation of the output shaft relative to the direction of rotation of the input shaft.

14. The transmission of claim 13, further comprising:
an overruning clutch for producing a one-way drive connection between the first shaft and the first drive mechanism.

15. A continually variable transmission for a motor vehicle driven by a power source, comprising:
an input shaft;
an output shaft;
a torque converter for producing a hydrodynamic connection between the power source and input shaft;
a first drive mechanism having a first input and a first output, for producing a forward fixed ratio of the speed of said first input to the speed of said first output;
a second drive mechanism arranged in parallel with the first drive mechanism, having a second input and second output, for producing a stepless, continually variable range of forward ratios of the speed of said second input to the speed of said second output, the lowest ratio produced by the second drive mechanism being higher than the fixed speed ratio produced by the first drive mechanism;
a mode clutch for alternately driveably connecting and releasing a pair of members selected from either a first group consisting of the first input or second input and a second group consisting of the first output and second output; and
means for driving the output shaft in the same direction as the input shaft and for reversing the direction of rotation of the output shaft relative to the direction of rotation of the input shaft.

16. The transmission of claim 15, comprising:
a first shaft driveably connected to the first input;
a second shaft coaxial with the first shaft and driveably connected to the second input;
a third shaft disposed parallel to the first shaft and second shaft, and driveably connected to the first output and second output; and
wherein the mode clutch alternately connects the first shaft and second shaft mutually and releases the first shaft and second shaft.

17. The transmission of claim 15, comprising:
a first shaft driveably connected to the first output;
a second shaft concentric with the first shaft and driveably connected to the second output;
a third shaft disposed parallel to the first shaft and second shaft, and driveably connected to the first input and second input; and
wherein the mode clutch alternately connects the first shaft and second shaft mutually and releases the first shaft and second shaft.

18. The transmission of claim 16, wherein the first drive mechanism comprises:
a first sprocket wheel fixed to the first shaft;
a layshaft disposed parallel to the first shaft;
a second sprocket wheel fixed to the layshaft;
a first chain or belt driveably engaging the first and second sprocket wheels;
a third sprocket wheel fixed to the layshaft and located adjacent the second sprocket wheel;
a fourth sprocket wheel;
an overrunning clutch supported on the third shaft, for producing a one-way drive connection between the third shaft and fourth sprocket wheel; and
a second chain or belt driveably engaging the third and fourth sprocket wheels.

19. The transmission of claim 17, wherein the first drive mechanism comprises:
a first sprocket wheel fixed to the third shaft;
a layshaft disposed parallel to the third shaft;
a second sprocket wheel fixed to the layshaft;
a first chain or belt driveably engaging the first and second sprocket wheels;
a third sprocket wheel fixed to the layshaft and located adjacent the second sprocket wheel;
a fourth sprocket wheel;
an overrunning clutch supported on the second shaft, for producing a one-way drive connection between the second shaft and fourth sprocket wheel; and
a second chain or belt driveably engaging the third and fourth sprocket wheels.

20. The transmission of claim 16, wherein the driving means comprises:
a sun gear driveably connected to the third shaft;
a ring gear surrounding the sun gear;
a carrier driveably connected to the output shaft;
a first set of planet pinions rotatably supported on the carrier, in continuous meshing engagement with the sun gear;
a second set of planet pinions rotatably supported on the carrier, in continuous meshing engagement with the ring gear and the first set of planet pinions;
a forward-reverse clutch for alternately driveably connecting mutually and releasing the third shaft and a member of the group consisting of the ring gear and carrier; and a reverse brake for alternately holding the ring gear against rotation and releasing the ring to rotate freely.

21. The transmission of claim 16, wherein the driving means comprises:

a sun gear driveably connected to the third shaft;

a ring gear surrounding the sun gear;

a carrier driveably connected to the output shaft;

a first set of planet pinions rotatably supported on the carrier, in continuous meshing engagement with the sun gear;

a second set of planet pinions rotatably supported on the carrier, in continuous meshing engagement with the ring gear and the first set of planet pinions;

a forward-reverse clutch for alternately driveably connecting mutually and releasing the carrier and third shaft; and a reverse brake for alternately holding the ring gear against rotation and releasing the ring to rotate freely.

22. A continually variable transmission for a motor vehicle driven by a power source, comprising:

an input shaft;

an output shaft;

a torque converter for producing a hydrodynamic connection between the power source and input shaft;

a first drive mechanism having a first input and a first output, for producing a forward fixed ratio of the speed of said first input to the speed of said first output;

a second drive mechanism arranged in parallel with the first drive mechanism, having a second input and second output, for producing a stepless, continually variable range of forward ratios of the speed of said second input to the speed of said second output, the lowest ratio produced by the second drive mechanism being higher than the fixed speed ratio produced by the first drive mechanism;

a mode clutch for alternately driveably connecting and releasing a first pair of members selected from either a first group consisting of the first input or second input and a second group consisting of the first output and second output, and means for driving the output shaft in the same direction as the input shaft and for reversing the direction of rotation of the output shaft relative to the direction of rotation of the input shaft.

23. The transmission of claim 22, comprising:

a first shaft driveably connected to the first input;

a second shaft coaxial with the first shaft and driveably connected to the second input;

a third shaft disposed parallel to the first shaft and second shaft, and driveably connected to the first output and second output; and wherein the mode clutch alternately connects the first shaft and second shaft mutually and releases the first shaft and second shaft.

24. The transmission of claim 22, comprising:

a first shaft driveably connected to the first output;

a second shaft concentric with the first shaft and driveably connected to the second output, a third shaft disposed parallel to the first shaft and second shaft, and driveably connected to the first input and second input; and wherein the mode clutch alternately connects the first shaft and second shaft mutually and releases the first shaft and second shaft.

25. The transmission of claim 23 wherein the first drive mechanism, comprises:

a first sprocket wheel fixed to the first shaft;

a layshaft disposed parallel to the first shaft;

a second sprocket wheel fixed to the layshaft;

a first chain or belt driveably engaging the first and second sprocket wheels;

a third sprocket wheel fixed to the layshaft and located adjacent the second sprocket wheel;

a fourth sprocket wheel;

an overrunning clutch supported on the third shaft, for producing a one-way drive connection between the third shaft and fourth sprocket wheel; and a second chain or belt driveably engaging the third and fourth sprocket wheels.

26. The transmission of claim 24 wherein the first drive mechanism, comprises:

a first sprocket wheel fixed to the third shaft;

a layshaft disposed parallel to the third shaft;

a second sprocket wheel fixed to the layshaft;

a first chain or belt driveably engaging the first and second sprocket wheels;

a third sprocket wheel fixed to the layshaft and located adjacent the second sprocket wheel;

a fourth sprocket wheel;

an overrunning clutch supported on the second shaft, for producing a one-way drive connection between the second shaft and fourth sprocket wheel; and a second chain or belt driveably engaging the third and fourth sprocket wheels.

27. The transmission of claim 23, wherein the driving means comprises:

a sun gear driveably connected to the third shaft;

a ring gear surrounding the sun gear;

a carrier driveably connected to the output shaft;

a first set of planet pinions rotatably supported on the carrier, in continuous meshing engagement with the sun gear;

a second set of planet pinions rotatably supported on the carrier, in continuous meshing engagement with the ring gear and the first set of planet pinions;

a forward-reverse clutch for alternately driveably connecting mutually and releasing the third shaft and a member of the group consisting of the ring gear and carrier; and a reverse brake for alternately holding the ring gear against rotation and releasing the ring to rotate freely.

28. The transmission of claim 23, wherein the driving means comprises:

a sun gear driveably connected to the third shaft;

a ring gear surrounding the sun gear;

a carrier driveably connected to the output shaft;

a first set of planet pinions rotatably supported on the carrier, in continuous meshing engagement with the sun gear;

a second set of planet pinions rotatably supported on the carrier, in continuous meshing engagement with the ring gear and the first set of planet pinions;

a forward-reverse clutch for alternately driveably connecting mutually and releasing the carrier and third shaft; and a reverse brake for alternately holding the ring gear against rotation and releasing the ring to rotate freely.

* * * * *